(12) United States Patent
Cullafroz et al.

(10) Patent No.: US 7,971,330 B2
(45) Date of Patent: Jul. 5, 2011

(54) METHOD OF REPAIRING A NUCLEAR REACTOR VESSEL BOTTOM HEAD PENETRATION

(75) Inventors: Michel Cullafroz, Ouroux sur Saone (FR); Pierre Croutaz, Chalon sur Saone (FR)

(73) Assignee: Areva NP, Courbevoie (FR)

( * ) Notice: Subject to any disclaimer, the term of this patent is extended or adjusted under 35 U.S.C. 154(b) by 1260 days.

(21) Appl. No.: 11/763,790

(22) Filed: Jun. 15, 2007

(65) Prior Publication Data

US 2008/0163472 A1 Jul. 10, 2008

(30) Foreign Application Priority Data

Jun. 16, 2006 (FR) ..................... 06 05401

(51) Int. Cl.
B23P 6/00 (2006.01)
(52) U.S. Cl. ............... 29/402.18; 29/402.09; 29/402.13; 29/402.16
(58) Field of Classification Search ............... 29/402.03, 29/402.09, 402.13, 402.16, 402.18
See application file for complete search history.

(56) References Cited

U.S. PATENT DOCUMENTS

| | | | | | |
|---|---|---|---|---|---|
| 4,440,339 | A | * | 4/1984 | Tamai et al. | 228/119 |
| 4,826,217 | A | * | 5/1989 | Guerrero | 285/141.1 |
| 5,006,300 | A | * | 4/1991 | Jonsson et al. | 376/203 |
| 5,209,894 | A | * | 5/1993 | Borrman et al. | 376/203 |
| 5,428,198 | A | * | 6/1995 | Peigney et al. | 219/61 |
| 5,515,589 | A | | 5/1996 | Kazirskis et al. | |
| 5,674,419 | A | * | 10/1997 | Koide et al. | 219/137 WM |
| 5,796,797 | A | * | 8/1998 | Fallas | 376/260 |
| 5,809,098 | A | * | 9/1998 | Deaver | 376/203 |
| 5,966,308 | A | * | 10/1999 | Kazirskis et al. | 700/195 |
| 6,834,092 | B2 | * | 12/2004 | Willis et al. | 376/260 |
| 7,520,043 | B2 | * | 4/2009 | Bon et al. | 29/525.14 |
| 2005/0220250 | A1 | | 10/2005 | Payne et al. | |

FOREIGN PATENT DOCUMENTS

| | | |
|---|---|---|
| EP | 0 598 634 A1 | 5/1994 |
| EP | 1 584 999 A | 10/2005 |
| WO | WO-2004/110691 A | 12/2004 |

* cited by examiner

*Primary Examiner* — Essama Omgba
(74) *Attorney, Agent, or Firm* — Connolly Bove Lodge & Hutz LLP

(57) ABSTRACT

A method of repairing a vessel bottom head penetration of a nuclear reactor is presented, said penetration comprising a tube fastened to the internal wall of the vessel bottom head by an internal weld bead and emerging outside the vessel bottom head, forming a groove. The method consists inter alia in preparing a mock-up representative of the vessel bottom head penetration to be repaired and in depositing this mock-up on site in an irradiation-free zone, in fastening two half-inserts to this mock-up in the groove, each half-insert having a profile corresponding to the half-profile of the groove, in forming, again on this mock-up, automatically and by remote control, a weld bead in the groove, in carrying out a dimensional check and, after validation of this weld bead, in carrying out the steps of fastening the two half-inserts and forming a weld bead automatically, directly in the groove of the vessel bottom head penetration to be repaired.

8 Claims, 4 Drawing Sheets

METHOD OF REPAIRING A NUCLEAR REACTOR VESSEL BOTTOM HEAD PENETRATION

This application claims priority under 35 U.S.C. §119(a) on Patent Application No(s). 06 05401 filed in France on Jun. 16, 2006, the entire contents of which is hereby incorporated by reference.

SUMMARY OF THE INVENTION

The present invention relates to a method of repairing a vessel bottom head penetration of a nuclear reactor and in particular a pressurized-water nuclear reactor.

BRIEF DESCRIPTION OF THE INVENTION

A pressurized-water reactor comprises a vessel filled, when the reactor is in operation, with a cooling fluid consisting of pressurized water. The core of the reactor consisting of fuel assemblies is entirely immersed in the cooling water.

When operating such reactors, it is necessary to take measurements in the core while the reactor is operating. In particular, it is necessary to take neutron flux measurements at various points over the height of the core in order to know the neutron flux distribution and power distribution along the axial direction of the core, which generally corresponds to the vertical direction.

The fuel assemblies constituting the core include, in their central part, an instrumentation tube into which a sealed thimble may be introduced over the entire height of the core, in which thimble a neutron flux measurement probe is placed during operation of the reactor.

The thimbles associated with each of the fuel assemblies in which the flux measurements are carried out must be able to be extracted from these assemblies, for example when the core is being refuelled. These thimbles are therefore mounted so as to move and slide inside the guide tubes joining the lower portion of the vessel to a measurement or instrumentation room in which the opposite ends of the thimbles from the ends introduced into the core are accessible in order to move the probes, so as to collect measurement signals from said probes, and in order to move the thimbles inside the guide tubes. The thimbles are moved inside the guide tubes by simply pushing or pulling them, a sufficient clearance being provided so as to limit the forces to be exerted on the thimbles, despite the fact that the guide tubes are curved over most of their path.

To allow the various thimbles associated with the fuel rods to penetrate into the reactor core, a number of tubes called vessel bottom penetration tubes pass through the vessel bottom head.

The tube of each vessel bottom penetration has, on the one hand, an upper end emerging inside the vessel in an instrumentation column for the passage of a thimble and, on the other hand, a lower end emerging outside this vessel and connected to the corresponding thimble guide tube. Each tube, made of "Inconel" alloy is fastened to the internal wall of the vessel bottom head, made of ferritic steel coated with a layer of stainless steel, by a weld bead made of "Inconel" alloy, which is intended in particular to seal between the inside and the outside of this vessel.

Now, it may turn out that, after the reactor has been operated for a certain time, microcracks form in the internal weld bead of a tube of a vessel bottom head penetration, which thus causes weeping on the tube resulting in a whitish deposit on the external surface of said tube, coming from the boron contained in the coolant of the reactor as neutron flux moderator of this reactor.

This is because the boron is dissolved in the coolant and, when this coolant weeps along the vessel bottom head penetration tube, it evaporates owing to the pressure and temperature prevailing inside the vessel. The boron, in the form of a powdery deposit, is therefore present on the external surface of the tube and also both over the thickness of the vessel bottom head wall and along this tube to the outside of the vessel.

One repair method, which naturally comes to mind to those skilled in the art for remedying this problem, consists in depositing, in the space located at the intersection of the external wall of the vessel and the external wall of the tube of the vessel bottom head penetration to be repaired, which space is denoted hereafter by the term "groove", a weld bead.

However, many problems arise.

Firstly, the zone in which the work has to be carried out, beneath the reactor vessel, is highly irradiated, thus precluding the presence of humans. Secondly, the groove has a changing profile following a warped curve, so that to deposit a weld bead comprising several layers in said groove requires the use of an automatic welding tool capable of carrying out the work in a highly irradiated zone without human presence.

In addition, when the welding is being carried out in the groove, the boron deposited on the external wall of the tube, between this wall and the vessel bottom head wall, may mix with the weld metal and therefore run the risk long term of causing cracks in the weld bead, precluding the desired sealing.

A known method consists in first plugging, via the inside of the vessel, the tube of the vessel bottom head penetration, then in cutting, substantially at mid-thickness of the vessel wall, the vessel bottom head penetration tube and, after having extracted this tube portion, in replacing it with a new tube portion.

Next, to hold the tube in place and to seal it, a weld bead is deposited in the groove left between the external wall of the vessel bottom head and the external wall of the new tube portion.

The object of the invention is to propose a method of repairing a vessel bottom head penetration that avoids the abovementioned drawbacks and, in particular, avoids the preliminary operation of plugging the tube, consequently reducing the time that operators have to be present in a highly irradiated zone.

The subject of the invention is therefore a method of repairing a vessel bottom head penetration of a nuclear reactor, said penetration comprising a tube fastened to the internal wall of the vessel bottom head by an internal weld bead and emerging outside the vessel bottom head, forming with the external wall of said vessel bottom head, a groove, characterized in that it consists of the following steps:

after having observed, on the tube and on the outside of the vessel bottom head, a deposit of boron indicating a leak through the internal weld bead, a mock-up representative of the vessel bottom head penetration to be repaired and comprising a vessel bottom head portion and a tube forming, with the said portion, a groove, is prepared and this mock-up is placed on site in an irradiation-free zone;

two half-inserts are fastened to this mock-up in the groove, each half-insert having a profile corresponding to the half-profile of the groove;

a weld bead is formed, again on this mock-up, automatically in the groove and the good distribution of the welding passes is verified;

a dimensional check of the weld bead is carried out on the mock-up and after this weld bead has been validated;

the boron on the tube of the vessel bottom head penetration to be repaired is removed, preferably by brushing it off; and the step of fastening the two half-inserts and then the step of forming a weld bead, automatically and by remote control, directly in the groove of the vessel bottom head penetration to be repaired are carried out.

According to other features of the invention:

the weld bead is formed on the vessel bottom head penetration to be repaired, automatically, as several layers, each layer comprising at least one pass;

the various layers are formed by means of an automatic welding torch having four axes of movement, said torch being remotely controlled from a radiation-free zone;

a liquid penetrant test is carried out after the first layer and the last layer of the weld bead have been formed on the vessel bottom head penetration to be repaired, and preferably such a test is carried out on every third layer;

at least one intermediate liquid penetrant test is carried out between forming the first layer and the last layer of the weld bead on the vessel bottom head penetration to be repaired;

at least one welding pass is carried out automatically for each layer so as to fill the groove;

each half-insert has a triangular cross section; and the angle of the triangle of the cross section of each half-insert placed in the bottom of the groove includes a flat.

The features and advantages of the invention will become apparent over the course of the description that follows, given by way of example and with reference to the appended drawings in which:

DETAILED DESCRIPTION OF THE INVENTION

Figure 1:
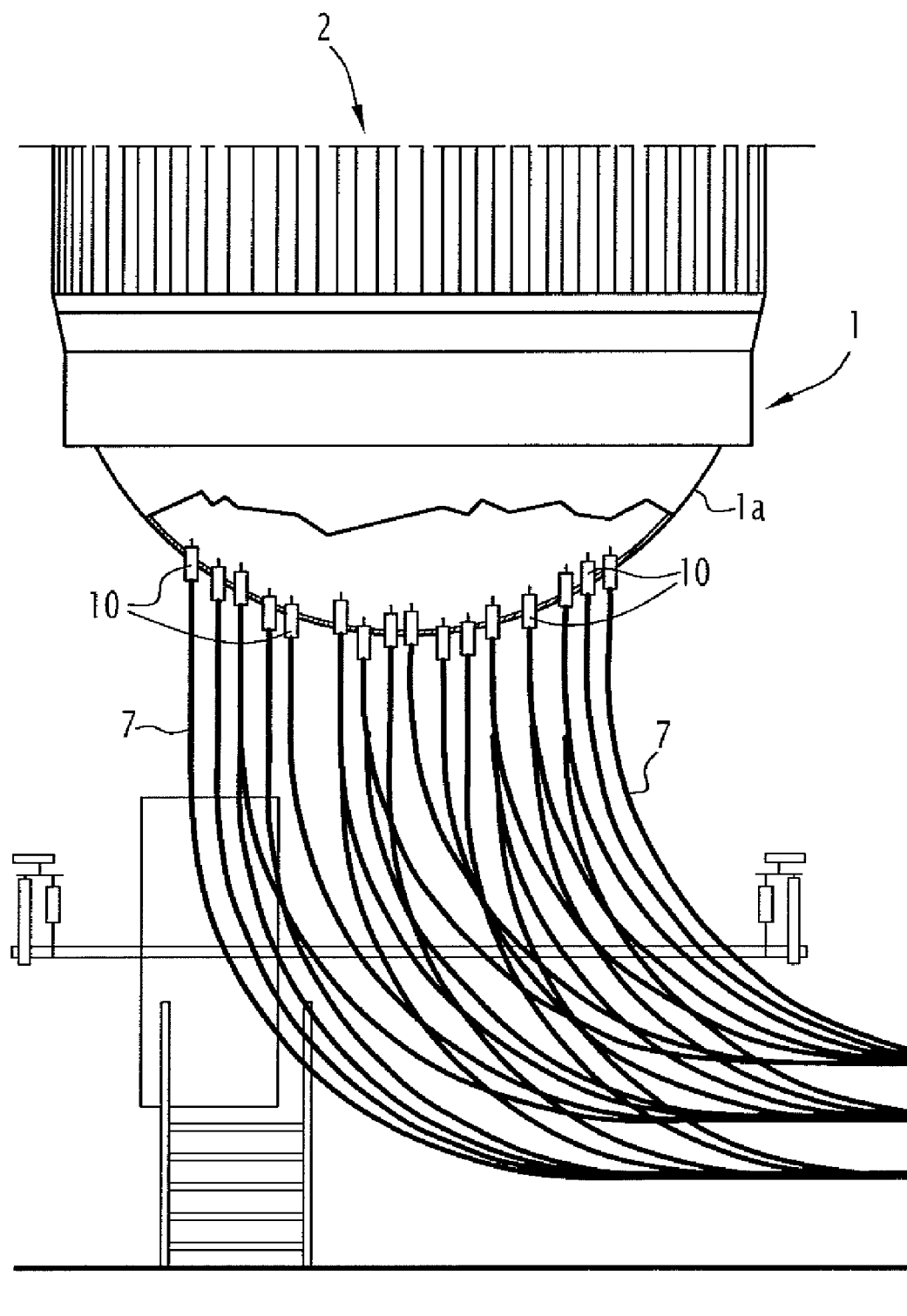
FIG. 1 is a schematic view, in section and in elevation, of the lower portion of a vessel of a pressurized-water nuclear reactor.
Figure 2:
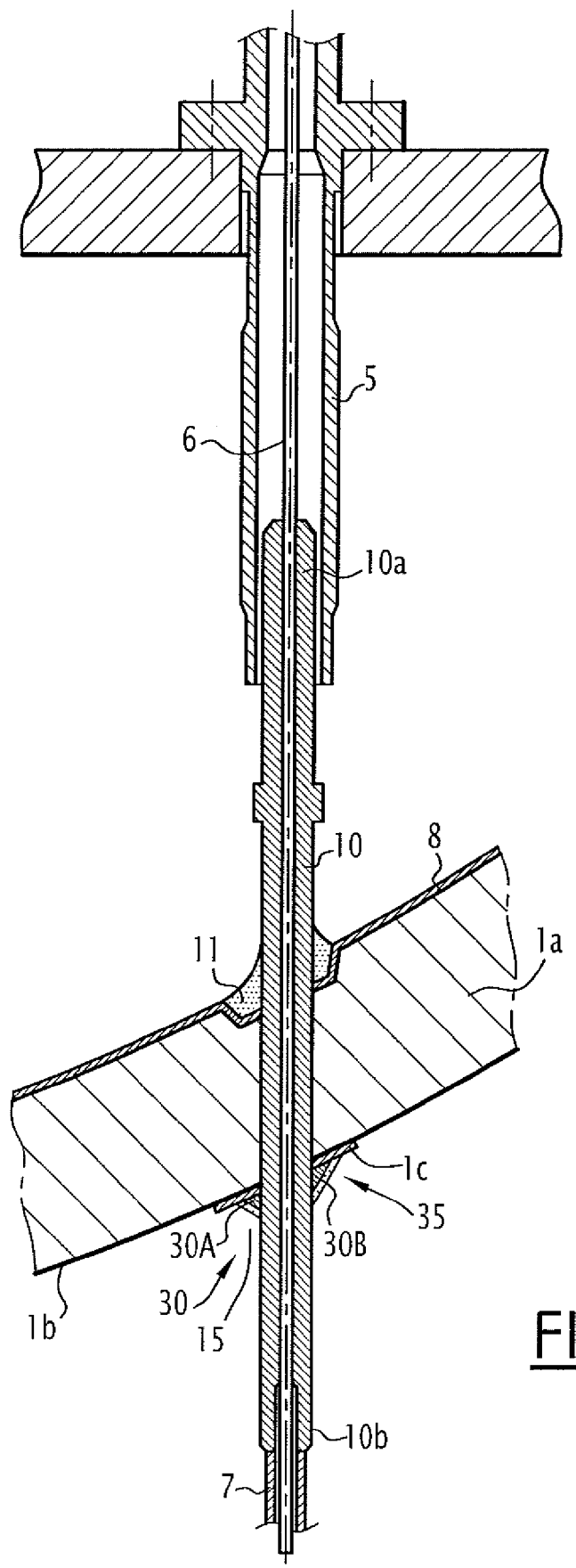
FIG. 2 is a schematic view, in axial section, of a vessel bottom head penetration.

FIG. 1 shows schematically a bottom head $1a$ of a pressurized-water nuclear reactor vessel 1 containing a reactor core 2 (not shown) consisting of fuel assemblies. The vessel bottom head $1a$ has the form of a spherical dome. Referring to FIG. 2, the internal wall of this vessel bottom head is covered with a stainless steel coating 8 and its external wall is covered with an Inconel coating $1b$.

While this type of nuclear reactor is operating, measurements are made in the core 2 in order in particular to determine the neutron flux distribution at various points over the height of this core. To do this, the fuel assemblies constituting the core 2 include, in their central part, an instrumentation tube 5 (FIG. 2) into which may be introduced, over the entire height of the core, a sealed thimble 6 inside which a neutron flux measurement probe is moved during operation of the reactor.

The thimbles 6 must be able to be removed from the assemblies, for example when the core is being refuelled.

These thimbles are therefore mounted so as to be able to be moved and slide inside the guide tubes 7 (FIGS. 1 and 2) that join the lower portion of the tube 10 of the vessel bottom head penetration to a measurement or instrumentation room (not shown) in which the opposite ends of the thimbles from the ends introduced into the core are accessible in order to move the probes, to collect the measurement signals and to move the thimbles inside the guide tubes 7.

As shown in FIG. 1, to allow the various thimbles associated with the fuel assemblies to penetrate inside the reactor core 2, the vessel bottom head $1a$ is penetrated by vessel bottom head penetration tubes 10.

As shown more particularly in FIG. 2, the tube 10 of each vessel bottom head penetration has an upper end $10a$ emerging in an instrumentation tube 5 and a lower end $10b$ emerging outside the vessel bottom head $1a$ and connected to the guide tube 7 for the corresponding thimble 6.

Each tube 10 is fastened to the internal wall of the vessel bottom head $1a$ by a weld bead 11.

As is apparent in FIG. 1, the vessel bottom head $1a$ therefore includes a plurality of tubes 10 that are approximately parallel to the longitudinal axis of the vessel and are distributed at various points over the spherical dome of the vessel bottom head. The tube 10 for each vessel bottom head penetration defines, with the external wall $1b$ of the vessel bottom head $1a$, a groove 15 having, owing to the spherical dome shape of this vessel bottom head $1a$, an intersection along a warped curve. This is because, and as may be seen in FIG. 2, the opening of the groove 15 around the tube 10 varies according to the position of the penetration on the vessel bottom head, on the one hand, and according to the radial orientation around the tube, on the other.

If, during a maintenance check, the presence of boron in the form of a deposit is detected on the external wall of the tube 10 of a vessel bottom head penetration, on the outside of the vessel bottom head $1a$, meaning that the weld bead 11 of this tube 10 is cracked, a repair must be carried out on said tube 10.

The method according to the invention allows this type of repair to be performed by carrying out, beforehand, all the necessary operations on a mock-up representative of the vessel bottom head penetration to be repaired, said mock-up being located on site in an irradiation-free zone and then by reproducing the operations directly on the vessel bottom head penetration to be repaired, thereby making it possible for the work time and the presence of operators in a highly irradiated zone to be considerably reduced.

Figure 3:
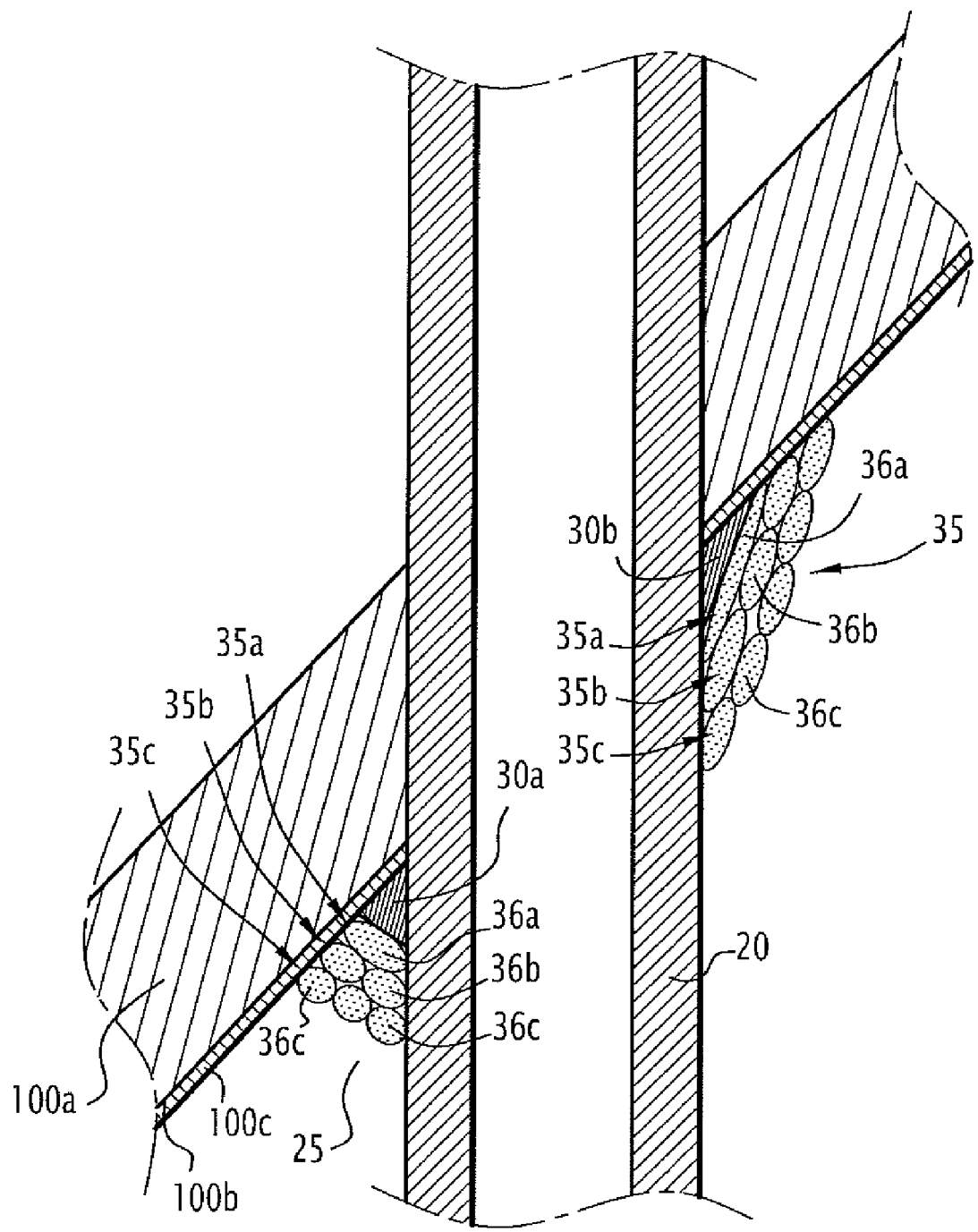
FIG. 3 is a schematic view, in axial section, of a tube of a mock-up for a vessel bottom head penetration to be repaired, showing some of the various steps of the repair method according to the invention.

Thus, as shown in FIG. 3, a mock-up is constructed and this mock-up, which is representative of the vessel bottom head penetration to be repaired, comprises a portion of a tube 20 that passes through a vessel bottom head portion $100a$ that has the same characteristics and the same dimensions as a portion of the vessel bottom head $1a$. The tube 20 defines, with the external wall $100b$ of the vessel bottom head $100a$, a groove 25 identical to the groove 15 of the tube 10 of the vessel bottom head penetration to be repaired. The external wall $100b$ of the vessel bottom head $100a$ of this mock-up is also covered with an Inconel coating $100c$ identical to that coating $1c$ deposited on the external wall $1b$ of the vessel bottom head $1a$.

Figure 4:
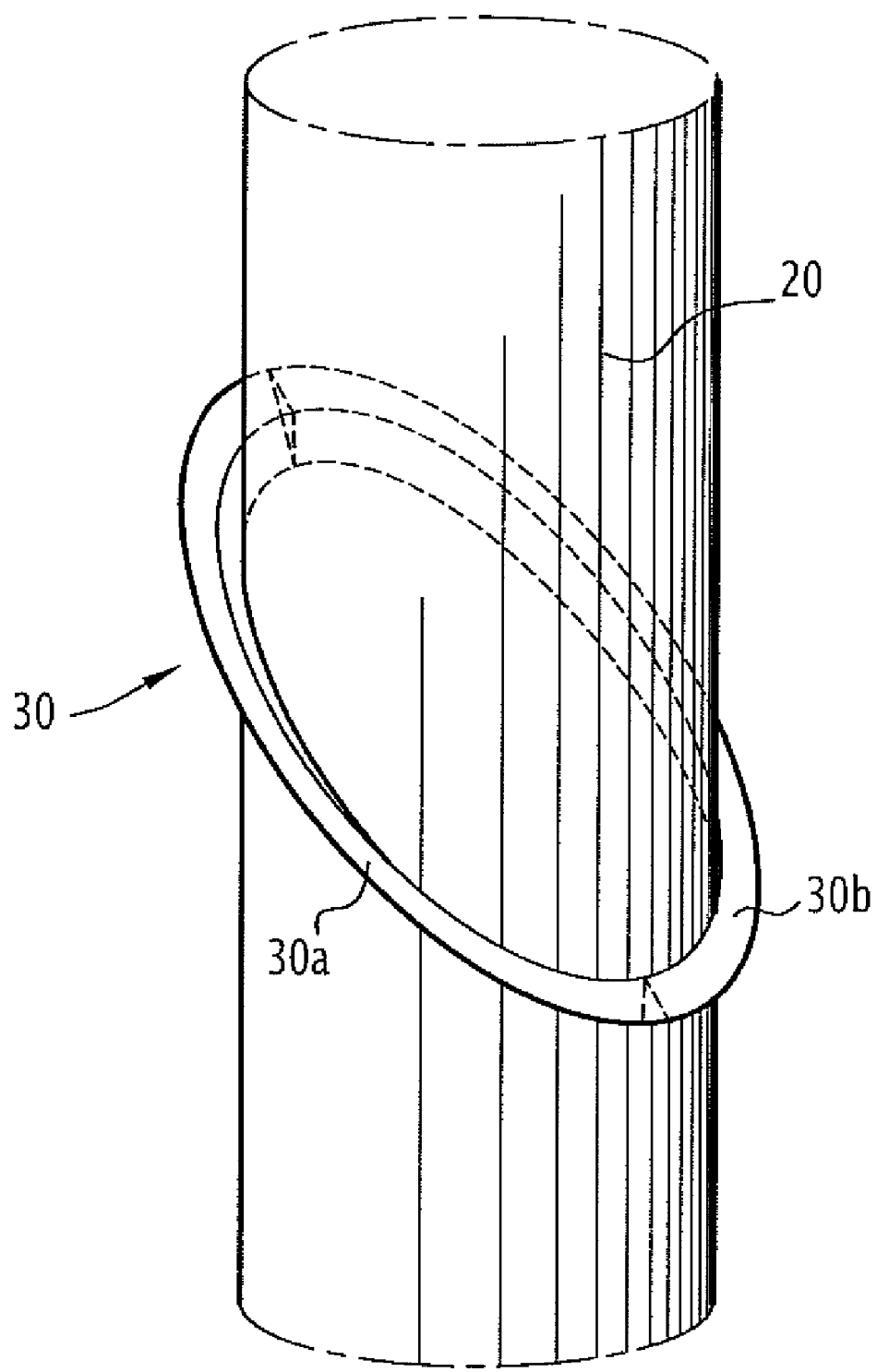
FIG. 4 is a schematic view, on a larger scale, of the tube of the mock-up representative of the tube of the vessel bottom head penetration to be repaired, in which the two half-inserts have been shown.

Once this mock-up has been produced, an insert 30 is prepared, this insert 30 consisting, as is apparent in FIG. 4, of two half-inserts, $30a$ and $30b$ respectively, each having a profile corresponding to the half-profile of the groove 25. The two half-inserts 30a and 30b each have a triangular cross section and have, like the groove 25, a profile that changes along a warped curve.

The two half-inserts 30a and 30b are positioned in the groove 25 and fastened to the external wall 100b of the vessel bottom head portion 100a of the mock-up and also to the external wall of the tube 20 of this mock-up. These two half-inserts 30a and 30b are for example fastened by manual spot welding or by any other method.

Next, a weld bead denoted by the reference 35 is formed in the groove 25 of the mock-up.

As shown in FIG. 3, the weld bead 35 is formed automatically by means of a welding torch designed especially to be easily placed around the penetration tube and remotely controlled, as several layers 35a, 35b, 35c, . . . 35n, each layer comprising several passes 36a, 36b, 36c, . . . 36n, the number of which is determined according to the width of the groove 25 in order to fill the gap separating the external wall 100b of the vessel bottom head 100a of the mock-up from the external wall of the tube 20.

In FIG. 3, various passes of each of the layers have been shown by sections of elliptical shape in order to make the figure easier to understand, although it is obvious that the weld metal making up the passes of each of the layers constitutes a homogeneous whole.

In the example shown in FIG. 3, the first layer 35a comprises one pass 35b, this first layer filling the space separating the two side walls of the groove 25. The second layer 35b comprises, in the zone where the groove 25 is narrower, two passes 36b, while in the zone where the groove 25 is wider, it comprises three passes 36b so as to fill the space separating the two side walls of the groove 25. The third layer 25c comprises, in the zone where the groove 25 is narrowest, three passes 36c, whereas in the zone where the zone 25 is widest, this third layer 35c comprises five passes 36c. These examples are given by way of indication and, depending on the depth of the groove 25, the weld bead 35 comprises n layers and each layer itself comprises from 1 to n welding passes.

Each pass of each of the layers is performed automatically by means of said welding torch, starting from the lowest point of the groove 25 and rising over a half-path of this groove 25 towards the highest point. The second half-path of this same pass is always carried out by restarting from the lowest point and rising towards the highest point of the groove 25 so as to carry out a continuous welding pass over the entire perimeter of this groove 25.

The passes of each layer of the weld bead 35 are carried out using an automatic welding torch having four axes of movement in order to follow the trajectory of the intersection along a warped curve, preferably of the TIG type (not shown), which comprises a system of tongs fastened to the tube 20 of the mock-up supporting a base for positioning the automatic welding torch, this system of tongs and this positioning base remaining in place throughout the operation of forming the weld bead 35.

After this weld bead 35 has been formed, a dimensional check of this weld bead is carried out and if this weld bead is validated, the various operations of the repair method carried out on the mock-up are validated and authorization is given to carry out the repair on the tube 10 of the vessel bottom head penetration to be repaired.

Before carrying out the actual repair, the boron deposited on the external wall of the tube 10 of the vessel bottom head penetration to be repaired is removed, preferably by brushing it off or by any other appropriate means.

Next, the operations consisting in fastening the two half-inserts 30a and 30b of the insert 30 in the groove 15 and in depositing, in this groove 15 on top of the insert 30, a weld bead 35 identical to the weld bead 35 formed on the mock-up and by means of the same tooling, are reproduced directly on the tube 10 of the vessel bottom head penetration to be repaired.

Preferably, liquid penetrant tests are carried out, especially after the first layer and the last layer of the weld bead 35 have been formed. At least one intermediate liquid penetrant test is also carried out between the formation of the first layer and the last layer of the weld bead, and for example after forming the fourth layer.

Preferably, a liquid penetrant test is carried out every three layers.

According to a variant, the angle of the triangle of the cross section of each half-insert 30a and 30b of the insert 30 placed in the groove bottom 15 may include a flat so that this insert is not in contact with the intersection of the external wall of the vessel bottom head and of the tube, since this junction zone may contain boron.

Preferably, a dimensional conformity check of the weld bead 35 is not carried out on the tube 10 of the vessel bottom head penetration after repair so as not to expose operators to a high level of irradiation, but a justification is produced by a dimensional check of the weld bead made on the mock-up, under these same conditions.

If a liquid penetrant test reveals a non-conformity, the defective zone is remelted by means of the welding torch and then another liquid penetrant test is carried out on this zone. Of course, all of the welding and test operations are monitored by cameras.

Positioning the insert before forming the weld bead makes it possible to prevent the boron present between the vessel bottom wall and the tube being mixed with the weld metal during formation of the weld bead.

In addition, by carrying out all the repair operations beforehand on a mock-up on site away from the irradiated zone, it is possible to guarantee the feasibility of the repair method without exposing operators to high levels of irradiation.

Such a method therefore minimizes the presence of operators in the irradiated zone.

The invention claimed is:

1. A Method of repairing a vessel bottom head penetration of a nuclear reactor, said penetration comprising a tube fastened to an internal wall of the vessel bottom head by an internal weld bead and emerging outside the vessel bottom head, forming with the external wall of said vessel bottom head, a groove, wherein the method comprises the following steps:

after having observed, on the tube and on the outside of the vessel bottom head, a deposit of boron indicating a leak through the internal weld bead, a mock-up representative of the vessel bottom head penetration to be repaired and comprising a vessel bottom head portion and a tube forming, with the external wall of said portion, a groove, is prepared and this mock-up is placed on site in an irradiation-free zone;

two half-inserts are fastened to this mock-up in the groove, each half-insert having a profile corresponding to the half-profile of the groove;

a weld bead is formed, again on this mock-up, automatically and by remote control, in the groove and a good distribution of welding passes is verified;

a dimensional check of the weld bead is carried out on the mock-up and after this weld bead has been validated;

the boron on the tube of the vessel bottom head penetration to be repaired is removed, by brushing it off; and the step of fastening the two half-inserts and then the step of forming a weld bead, automatically and by remote control, directly in the groove of the vessel bottom head penetration to be repaired are carried out.

2. The method according to claim 1, wherein the weld bead is formed on the vessel bottom head penetration to be repaired, automatically, as several layers, each layer comprising at least one pass.

3. The method according to either of claim 1, wherein various layers are formed by means of an automatic welding torch having four axes of movement, said torch being remotely controlled from an irradiation-free zone.

4. The method according to claim 2, wherein a liquid penetrant test is carried out after the first layer and the last layer of the weld bead have been formed on the vessel bottom head penetration to be repaired, and such a test is carried out on every third layer.

5. A method according to claim 3, wherein at least one intermediate liquid penetrant test is carried out between producing the first layer and the last layer of the weld bead on the vessel bottom head penetration to be repaired.

6. A method according to claim 2, wherein at least one welding pass is carried out automatically for each layer so as to fill the groove.

7. The method according to claim 1, wherein each half-insert has a triangular cross section.

8. The method according to claim 7, wherein the angle of the triangle of the cross section of each half-insert placed in the bottom of the groove includes a flat.

* * * * *